United States Patent
Sugawara (10) Patent No.: US 8,131,973 B2
(45) Date of Patent: Mar. 6, 2012

(54) PRIORITY DETERMINATION WHEN DUMPING FILES

(75) Inventor: Akira Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 12/389,016

(22) Filed: Feb. 19, 2009

(65) Prior Publication Data

US 2009/0216967 A1 Aug. 27, 2009

(30) Foreign Application Priority Data

Feb. 26, 2008 (JP) ................................. 2008-44419

(51) Int. Cl.
  *G06F 12/10* (2006.01)
(52) U.S. Cl. .............. 711/203; 711/E12.058; 714/38.11
(58) Field of Classification Search ................ 714/38.11
  See application file for complete search history.

(56) References Cited

U.S. PATENT DOCUMENTS

| 5,559,978 | A  | * | 9/1996 | Spilo ............................. 711/203 |
| 6,681,348 | B1 | * | 1/2004 | Vachon ........................... 714/45 |
| 7,496,794 | B1 | * | 2/2009 | Eastham et al. ................ 714/37 |
| 7,698,598 | B1 | * | 4/2010 | Harris ............................. 714/37 |
| 2005/0210077 | A1 | * | 9/2005 | Balakrishnan et al. ....... 707/200 |
| 2007/0168991 | A1 | * | 7/2007 | Greenberg et al. ........... 717/127 |
| 2008/0126301 | A1 | * | 5/2008 | Bank et al. ...................... 707/3 |
| 2009/0031166 | A1 | * | 1/2009 | Kathail et al. .................. 714/4 |

FOREIGN PATENT DOCUMENTS

| JP | A 02-047735 | 2/1990 |
| JP | A 9-325903 | 12/1997 |
| WO | WO 2006/123351 A1 * | 11/2006 |

OTHER PUBLICATIONS

Richard W. Carr and John L. Hennessy. "WSClock—A Simple and Effective Algorithm for Virtual Memory Management." Dec. 1981. ACM. SOSP '81.*
David A. Patterson and John L. Hennessy. Computer Organization and Design. 1998. Morgan Kaufmann. $2^{nd}$ ed. p. 133.*
David Wilder. "LKCD Installation and Configuration." http://lkcd.sourceforge.net/doc/lkcd_tutorial.pdf.*

* cited by examiner

*Primary Examiner* — Reginald Bragdon
*Assistant Examiner* — Nathan N Sadler
(74) *Attorney, Agent, or Firm* — Greer, Burns & Crain, Ltd.

(57) ABSTRACT

A computer dumps information stored in a storage space used by a program, into a file when the program ends abnormally, by determining a priority representative of an order in which the information is dumped into the file, for storage areas which are predetermined areas into which the storage space is divided; compressing the information stored in each storage area in decreasing the order of priority and outputting the compressed information to the file in an order in which the information is compressed.

6 Claims, 12 Drawing Sheets

221

| ABNORMAL CODE | PRIORITY | | | | | |
|---|---|---|---|---|---|---|
| | PAGE NUMBER 1 | PAGE NUMBER 2 | PAGE NUMBER 3 | PAGE NUMBER 4 | PAGE NUMBER 5 | ... |
| 0001 | 1 | × | 3 | 4 | 2 | ... |
| 0002 | × | 2 | 3 | 1 | × | ... |
| 0003 | 1 | 2 | 5 | 4 | 3 | ... |
| . | . | . | . | . | . | . |
| . | . | . | . | . | . | . |
| . | . | . | . | . | . | . |

| PAGE NUMBER | PHYSICAL ADDRESS | UPDATE FLAG | REFERENCE FLAG | PAGING FLAG |
|---|---|---|---|---|
| 0 | 101 | 0 | 1 | 1 |
| 1 | 105 | 1 | 1 | 1 |
| 2 | 112 | 1 | 0 | 1 |
| 3 | 102 | 0 | 0 | 0 |
| ... | ... | ... | ... | ... |

| ABNORMAL CODE | PRIORITY | | | | | |
|---|---|---|---|---|---|---|
| | PAGE NUMBER 1 | PAGE NUMBER 2 | PAGE NUMBER 3 | PAGE NUMBER 4 | PAGE NUMBER 5 | ... |
| 0001 | 1 | × | 3 | 4 | 2 | ... |
| 0002 | × | 2 | 3 | 1 | × | ... |
| 0003 | 1 | 2 | 5 | 4 | 3 | ... |
| ... | ... | ... | ... | ... | ... | ... |

PRIORITY DETERMINATION WHEN DUMPING FILES

CROSS-REFERENCE TO RELATED APPLICATION

This application is based upon and claims the benefit of priority of the prior Japanese Patent Application No. 2008-44419, filed on Feb. 26, 2008 the entire contents of which are incorporated herein by reference.

FIELD

The present invention relates to a computer that dumps the information stored in a storage space used by a program, into a file when the program ends abnormally, a recording medium recording a dump program, and a dump method, and more particularly, to a computer capable of outputting the information necessary for failure analysis, to a dump file while the dump file size is small, a recording medium recording a dump program, and a dump method.

BACKGROUND

Conventionally, when some processing ends abnormally, the OS (operating system) mounted on a computer outputs the memory image at that time onto a magnetic disk, and creates a dump file. Then, the system administrator or the like analyzes the created dump file by using a predetermined analysis tool, thereby diagnosing the cause of the failure.

The OS reserves a predetermined space for creating the dump file on the magnetic disk in order that it can create the dump file whenever a processing ends abnormally. The predetermined space depends on the capacity of the memory mounted on the computer, and increases as the memory capacity increases.

In recent years, the memory capacity has increased, and the dump file size has increased accordingly. Since this decreases the space of the magnetic disk that the user can use, it is desired that the dump file size be reduced. However, if the dump file size is simply reduced, the information necessary at the time of failure analysis cannot be outputted to the dump file. Therefore, it is desired that the dump file size be reduced to the extent that the information necessary at the time of failure analysis can be outputted to the dump file.

SUMMARY

The present invention is made to solve the above-mentioned problem of the conventional technology, and an object thereof is to provide a computer capable of outputting the information necessary for failure analysis to a dump file while the dump file size is small, a recording medium recording a dump program, and a dump method.

To solve the above-mentioned problem and attain the object, a computer disclosed in the present application a dumps information stored in a storage space (corresponding to a "memory 110" in first to third embodiments) used by a program, into a file when the program ends abnormally, and is provided with: priority determination means for determining a priority representative of an order in which the information is dumped into the file, for each of one or more storage areas (corresponding to "memory areas" in the first to third embodiments) which are predetermined areas into which the storage space is divided; compression means for compressing the information stored in each storage area in decreasing order of priority determined by the priority determination means; and file output means for outputting the compressed information to the file in an order in which the information is compressed by the compression means.

A structure in which elements, expressions, or an arbitrary combination of elements of the computer disclosed in the present application is applied to a method, an apparatus, a system, a computer program, a recording medium, or a data structure is also effective as another mode.

DESCRIPTION OF EMBODIMENTS

Referring to the attached drawings, preferred embodiments of a computer, a dump program, and a dump method according to the present invention will be described in detail. It is to be noted that the present invention is not limited by the embodiments described below.

First Embodiment

Figure 1:
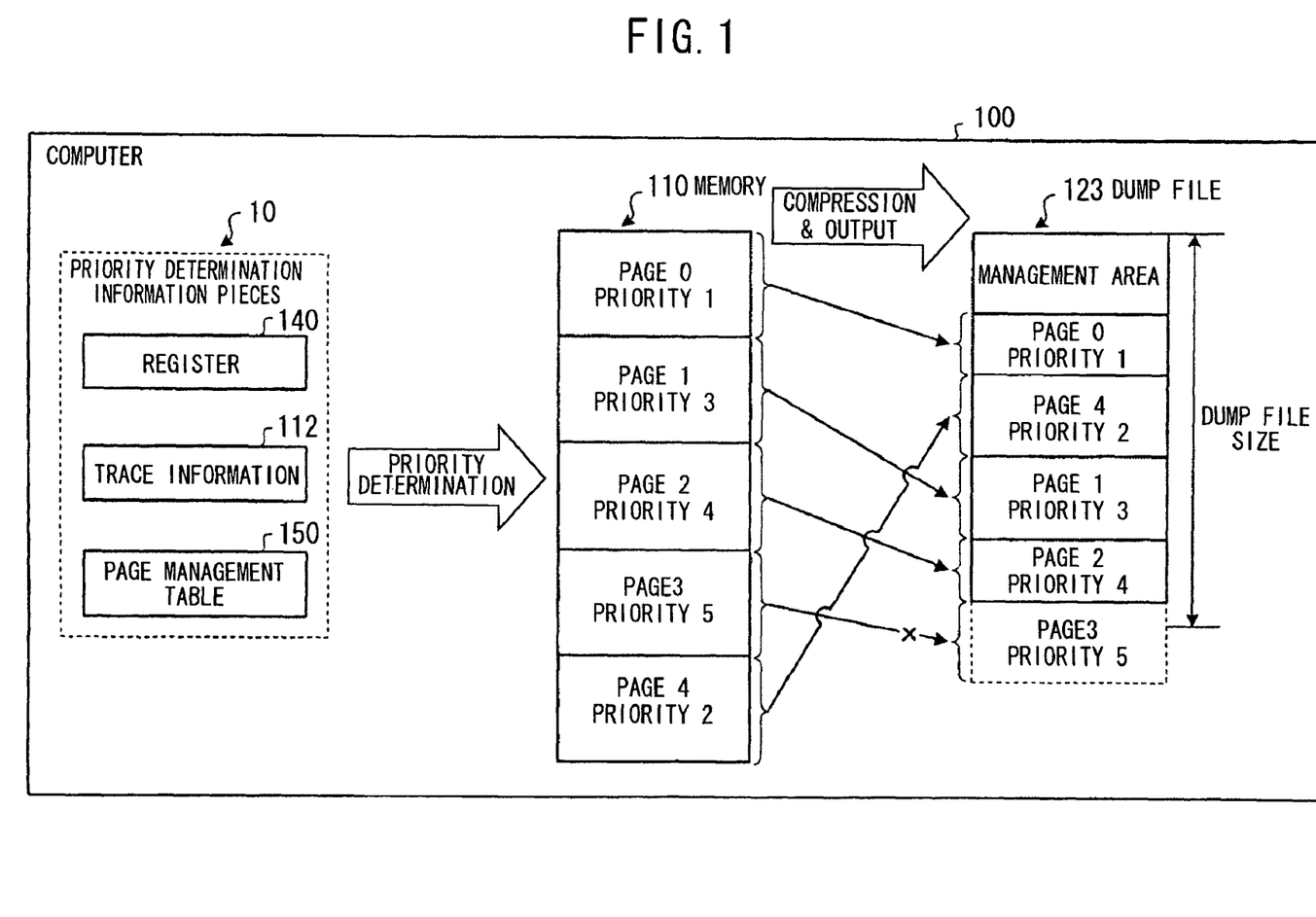
FIG. 1 is a view for explaining the general outline of the dump processing by a computer according to a first embodiment.

First, the general outline of the dump processing by a computer 100 according to a first embodiment will be described. FIG. 1 is a view for explaining the general outline of the dump processing by the computer 100 according to the first embodiment. In the description that follows, an example will be depicted in which the computer 100 manages the memory space by a paging method.

The computer 100 performs the dump processing to output the information stored in a memory 110 to a dump file 123 when a program running on the computer 100 ends abnormally. In performing the dump processing, the computer 100 according to the first embodiment determines the "priority," which is the order in which the information in the memory 110 is outputted to the dump file 123, for each memory area based on various pieces of information included in priority determination information pieces 10. Then, in decreasing order of priority, the computer 100 compresses the information stored in each memory area, and outputs the compressed information to the dump file 123.

The "memory area" referred to here is an area of a predetermined size into which the storage area of the memory 110 is divided. In the description that follows, a case is depicted in which the memory 110 is divided into areas of a size corresponding to one page (for example, 4 KB) of the paging method, and one page corresponds to one memory area. The unit of division of the memory 110 is not limited thereto. The memory 110 may be divided into areas of a size corresponding to a plurality of pages or into areas of a predetermined size.

The dump processing by the computer 100 will concretely be described. First, the priority determination information pieces 10 used when the priority determination processing is performed will be described. As depicted in the figure, the priority determination information pieces 10 include a register 140, trace information 112, and a page management table 150.

The register 140 is a register that temporarily stores the address representative of the storage position on the memory 110. While there are several kinds of registers and some registers temporarily store computation results of processings, data used for computations and the like, the register 140 is an address register that temporarily stores the address of the memory 110.

The computer 100 makes high the priority of the memory area represented by the address stored in the register 140. Since the information that is being processed is stored in the register 140, the memory area represented by the address stored in the register 140 is highly likely to be important in performing failure analysis. Therefore, by preferentially outputting to the dump file 123 the information in the memory area represented by the address stored in the register 140, the user can perform failure analysis by using important information.

The trace information 112 stores the histories of the processings performed by various programs. Specifically, the trace information 112 stores, in time sequence, records including the program numbers managed by the computer 100, the information (address) stored in the register 140, and the processing date and time.

The computer 100 makes high the priority of the memory area represented by the address stored in the register 140, based on the pieces of information stored in the trace information 112. Since that information was stored in the register 140 most recently, it follows that the information was being processed until recently, so such information is highly likely to be important in performing failure analysis. Therefore, by preferentially outputting to the dump file 123 the information in the memory area represented by the address that was stored in the register 140 until recently, the user can perform failure analysis by using important information.

The page management table 150 is a table generally used when the memory space is managed by the paging method, and stores, so as to be associated with page numbers, physical addresses representative of physical storage positions on the memory 110, flags representative of whether or not the information stored in the memory area (page) corresponding to the page number has been updated or referred to, and the like.

The computer 100 makes high the priority of the memory area storing the information that has been updated or referred to, based on the pieces of information stored in the page management table 150. Since that information has been updated or referred, it follows that the information was accessed recently, so such information is highly likely to be important in performing failure analysis. Therefore, by preferentially outputting to the dump file 123 the information that has been updated or referred to, the user can perform failure analysis by using important information.

Then, after determining the priority of each memory area, the computer 100 compresses the information stored in each memory area in decreasing order of priority, and outputs the compressed information to the dump file 123.

In the example depicted in FIG. 1, the computer 100 sets the priority of the memory area of a page number "0" at "1". The computer 100 sets the priority of the memory area of a page number "1" at "3", the priority of the memory area of a page number "2" at "4", the priority of the memory area of a page number "3" at "5", and the priority of the memory area of a page number "4" at "2". In the present specification, the lower the number is, the higher the priority is.

The computer 100 first compresses the information stored in the memory area of the page number "0" with the highest priority in the memory 110, and outputs the compressed information to the dump file 123. Then, the computer 100 compresses the information stored in the memory area of the page number "4" with the next highest priority, and outputs the compressed information to the dump file 123. Likewise, the computer 100 compresses the information in the memory area in the order of the page number "1" and the page number "2", and outputs the compressed information to the dump file 123. The computer 100 does not output the information stored in the memory area of the page number "3" to the dump file 123. This is because no free space is left in the dump file 123.

As described above, when programs end abnormally, the computer 100 according to the first embodiment does not unconditionally output the information on the memory areas used by the programs to the dump file 123, but determines the priority of each memory area based on the pieces of information included in the priority determination information pieces 10, compresses the information stored in each memory area in the order of the determined priority, and outputs the compressed information to the dump file 123 until no free space is left. Therefore, the computer 100 according to the first embodiment is capable of outputting the information necessary for failure analysis to the dump file 123 while keeping the size of the dump file 123 small.

Figure 2:
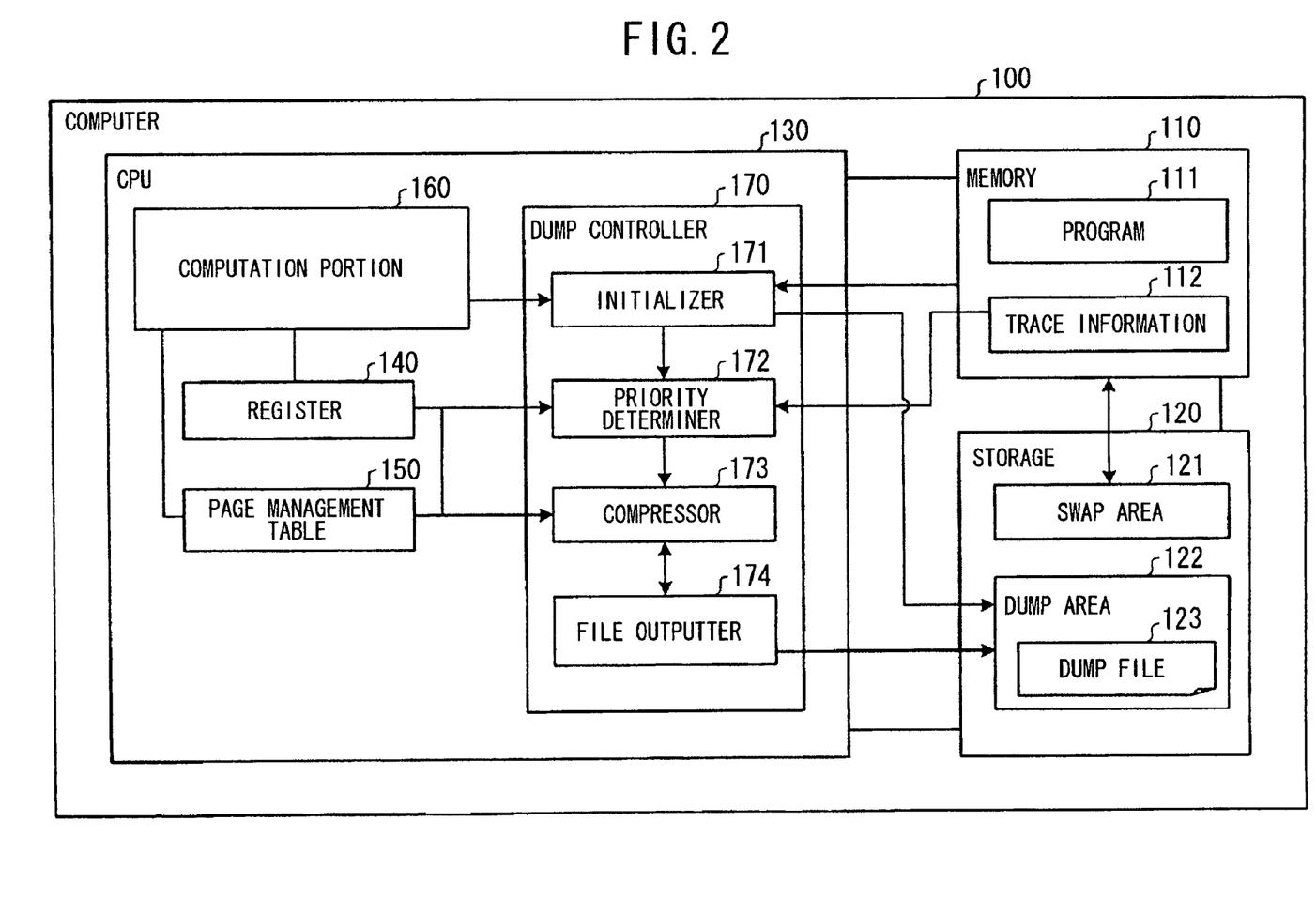
FIG. 2 is a functional block diagram depicting the structure of the computer according to the first embodiment.

Next, the structure of the computer 100 according to the first embodiment will be described. FIG. 2 is a functional block diagram depicted the structure of the computer 100 according to the first embodiment. As depicted in the figure, the computer 100 is an apparatus such as a personal computer, and is provided with the memory 110, a storage 120, and a CPU (central processing unit) 130. FIG. 2 does not depict functional portions not closely related to the dump processing by the computer 100.

The memory 110 is a memory such as a RAM (random access memory), and stores various pieces of information. Since the memory space is managed by the paging method in the computer 100, when it is necessary to allot a new page because there is no free space left in the memory 110, a non-illustrated memory manager pages out a predetermined page to a swap area 121 described later. When it is necessary to obtain the paged-out page, the non-illustrated memory manager pages in the page from the swap area 121 to a free space of the memory 110.

The memory 110 stores a program 111 and the trace information 112. The program 111 is a program for realizing a predetermined processing, and is executed by a computation portion 160 described later. The trace information 112 storing the history of the processing performed by the program 111 stores, in time sequence, records including the number of the program 111, the information stored in the register 140, and the processing date and time. While FIG. 2 depicts an example in which only one program 111 is executed, a plurality of different programs may be executed.

The storage 120 is a storage medium such as a magnetic disk, and includes the swap area 121 and a dump area 122. The swap area 121 stores the page paged out by the memory 110. The dump area 122 stores the dump file 123 created by a dump controller 170 described later. The dump file 123 is a file that stores the information stored in the memory 110 when the program 111 ends abnormally. The size of the dump file 123 is determined based on the information preset in the system.

The CPU 130 is an arithmetic unit that controls the entire computer 100, and is provided with the register 140, the page management table 150, the computation portion 160, and the dump controller 170. The register 140 is an address register that temporarily stores the address representative of the storage position on the memory 110.

Figure 3:
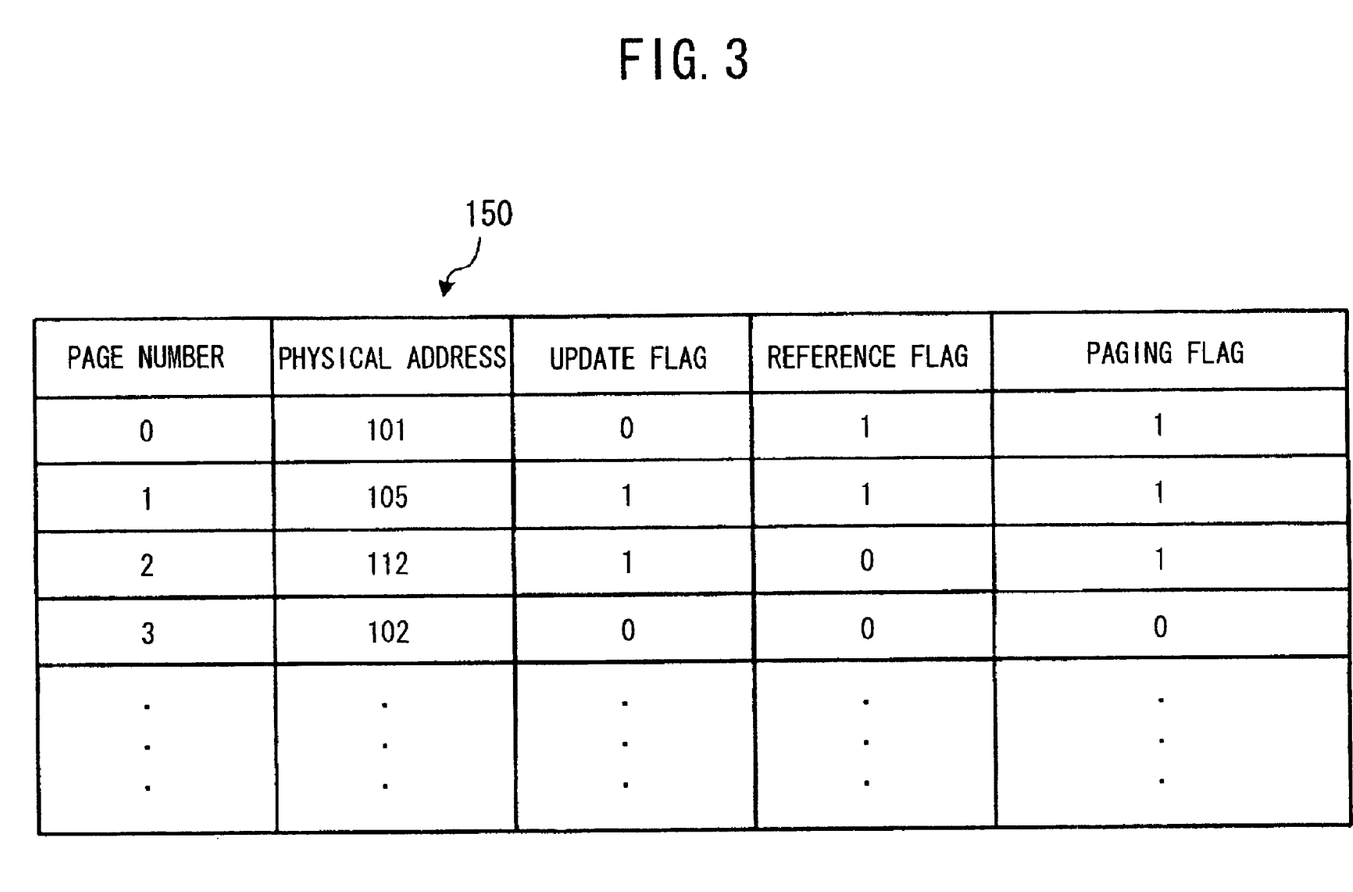
FIG. 3 is a view depicting an example of a page management table.

The page management table 150 is a table used when the memory space is managed by the paging method. An example of the page management table 150 is depicted in FIG. 3. As depicted in the figure, the page management table 150 stores physical addresses, update flags, reference flags, and paging flags so as to be associated with page numbers.

The page numbers represent numbers for identifying pages which are units when the memory 110 is divided into parts of a predetermined size. The physical addresses represent the physical storage positions on the memory 110 where the pages represented by the page numbers are stored.

The update flags are flags representative of whether the pages represented by the page numbers have been updated or not. In the figure, the update flag that is "1" indicates that the page represented by the corresponding page number has been updated, and the update flag that is "0" indicates that the page represented by the corresponding page number has not been updated.

The reference flags are flags representative of whether the pages represented by the page numbers have been referred to or not. In the figure, the reference flag that is "1" indicates that the page represented by the corresponding page number has been referred to, and the reference flag that is "0" indicates that the page represented by the corresponding page number has not been referred to.

The paging flags are flags representative of whether the pages represented by the page numbers are stored in the memory 110 or not. In other words, the paging flags are flags representative of whether the pages represented by the page numbers have been paged out or not. In the figure, the paging flag that is "1" indicates that the page represented by the corresponding page number is stored in the memory 110, and the paging flag that is "0" indicates that the page represented by the corresponding page number has been paged out and is stored in the swap area 121.

The first row of the page management table 150 depicted in FIG. 3 indicates that the memory area of the page number "0" is stored at the physical address "101", has not been updated (the update flag "0"), has been referred to (the reference flag "1"), and is stored in the memory 110 (paging flag "1").

The fourth row of the page management table 150 depicted in FIG. 3 indicates that the memory area of the page number "3" is stored at the physical address "102", has not been updated or referred to (the update flag "0", the reference flag "0") and is not stored in the memory 110 (the paging flag "0").

The computation portion 160 is a processor that performs various processings, and executes the program 111 in the example depicted in FIG. 2. When the program 111 is executed and ends abnormally, the computation portion 160 outputs a signal representative of the abnormal end to the dump controller 170.

The dump controller 170 is a processor that outputs the information stored in the memory 110 to the dump file 123 when the program 111 executed by the computation portion 160 ends abnormally, and is provided with an initializer 171, a priority determiner 172, a compressor 173, and a file outputter 174.

The initializer 171 is a processor that initializes the management area of the dump file 123. Specifically, when the signal representing that the program 111 ended abnormally is accepted from the computation portion 160, the initializer 171 calculates the size of the management area of the dump file 123 from the size of the memory 110, and reserves (initializes) the management area of the calculated size in the dump file 123.

The management area of the dump file 123 referred to here is an area for storing the information necessary when the dump file 123 is analyzed, and includes the page number, size, and offset of the information outputted to the dump file 123.

The priority determiner 172 is a processor that determines the priority of each memory area. Specifically, the priority determiner 172 first obtains the address stored in the register 140, and gives it the highest priority.

Then, the priority determiner 172 gives the second highest priority of the memory area to the "address stored in the register 140" stored in the trace information 112. At this time, the priority determiner 172 does not obtain the "address stored in the register 140" from all the records stored in the trace information 112 but obtains the "address stored in the register 140" only from a predetermined number of records stored last in the trace information 112. This is because the trace information 112 also stores old records and there is a possibility that old information is not important in performing failure analysis. The priority determiner 172 does not set the priority again for the memory areas the priorities of which have already been set.

The priority determiner 172 may set the priority so that memory areas represented by the "address stored in the register 140" in records stored into the trace information 112 later have higher priorities. For example, the priority determiner 172 may give the second highest priority of the memory area represented by the "address stored in the register 140" to the last record stored in the trace information 112, and give the third highest priority of the memory area represented by the "address stored in the register 140" to the second to last record stored in the trace information 112.

Then, the priority determiner 172 reads the page management table 150, and determines whether or not the information stored in each memory area has been updated or referred to. Then, the priority determiner 172 gives the third highest priority of the memory area to information that has been both updated and referred to, and gives the fourth highest the priority of the memory area to information that has been either updated or referred to. The priority determiner 172 does not set the priority again for memory areas the priorities of which have already been set. As described above, the information that has not been updated or referred to is rendered information that is not outputted to the dump file 123, whereby the amount of information outputted to the dump file 123 can be reduced.

For example, when the page management table 150 is as depicted in FIG. 3, the priority determiner 172 marks the third highest priority of the memory area of the page number "1" with the update flag "1" and the reference flag "1". Then, the priority determiner 172 marks the fourth highest priorities of the memory area of the page number "0" with the update flag "0" and the reference flag "1" and the memory area of the page number "2" with the update flag "1" and the reference flag "0".

In the above-described example, the priority determiner 172 first establishes the highest priority of the memory area determined by the information stored in the register 140, then, makes the second highest the priority of the memory area determined by the information stored in the trace information 112, and then, makes the third and fourth highest the priorities of the memory areas determined based on the information stored in the page management table 150. However, it is unnecessary to determine the priority in this order. For example, the priority determiner 172 may first make the first and second highest priorities determined based on the information stored in the page management table 150, then, make the third highest the priority of the memory area determined based on the information stored in the register 140, and then, make the fourth highest the priority of the memory area determined based on the information stored in the trace information 112.

The compressor 173 is a processor that compresses the information stored in each memory area in decreasing order of priority determined by the priority determiner 172. Specifically, the compressor 173 first compresses the information stored in the memory area with the highest priority, and then, outputs a signal representing that the compression processing has been finished, to the file outputter 174. Then, the compressor 173 compresses the information stored in the memory area with the second highest priority, and outputs the signal representing that the compression processing has been finished, to the file outputter 174. The compressor 173 repeats the processing to compress the information stored in each memory area in decreasing order of priority until a signal representing that there is no free space left in the dump file 123 is accepted from the file outputter 174 described later.

When the information to be compressed is paged out to the swap area 121, the compressor 173 pages in the target page from the swap area 121 to the memory 110, and then, compresses the paged-in information. The compressor 173 determines whether the information to be compressed has been paged out to the swap area 121 or not based on the paging flag of the page management table 150.

The file outputter 174 is a processor that outputs the compressed information to the dump file 123 in the order in which the information was compressed by the compressor 173. Specifically, when the signal representing that the compression processing has been finished is accepted from the compressor 173, the file outputter 174 measures the size of the compressed information. Then, the file outputter 174 outputs the compressed information to the dump file 123, and stores the page number, size, and offset of the outputted information into the management area of the dump file 123. Then, the file outputter 174 checks whether or not there is free space for further outputting information in the dump file 123, and when there is no free space left, outputs to the compressor 173 the signal representing that there is no free space left.

The page number, the size, and the offset are stored in the management area of the dump file 123 because the size of the compressed information is not fixed. That is, these are stored in order that the compressed information can be decompressed based on the pieces of information stored in the management area when the analysis tool analyzes the dump file 123.

Figure 4:
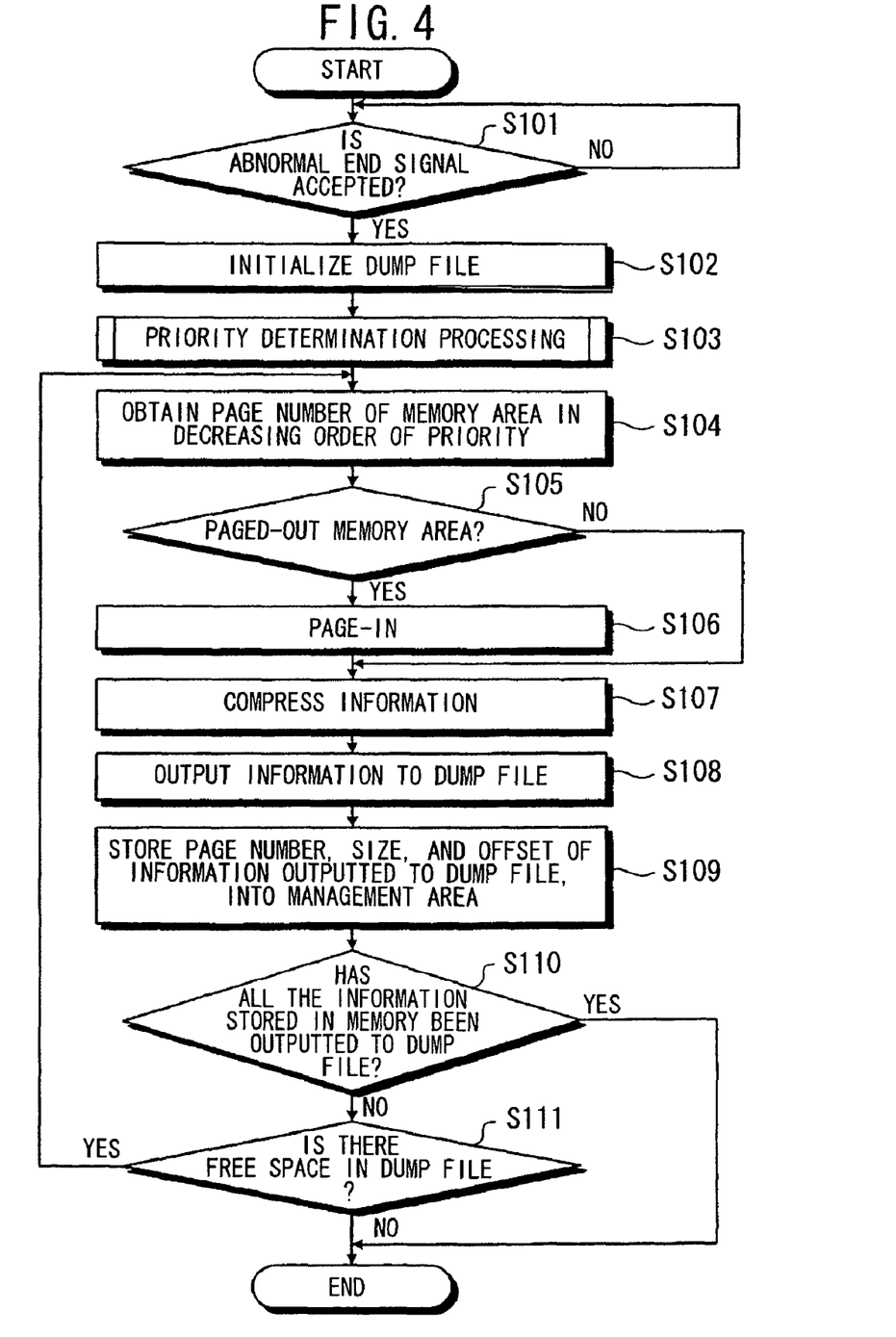
FIG. 4 is a flowchart depicting a dump processing procedure by the computer according to the first embodiment.

Next, the dump processing by the computer 100 according to the first embodiment will be described. FIG. 4 is a flowchart depicting the dump processing procedure by the computer 100 according to the first embodiment. As depicted in the figure, when the signal representing that the program 111 ended abnormally is accepted from the computation portion 160 (step S101, Yes), the initializer 171 of the computer 100 calculates the size of the management area of the dump file 123 from the size of the memory 110, and reserves (initializes) a management area of the calculated size in the dump file 123 (step S102). Then, the priority determiner 172 performs the priority determination processing to determine the priority of each memory area (step S103). The priority determination processing by the priority determiner 172 will be described later.

Then, the compressor 173 obtains the page number of the memory area with the highest priority determined by the priority determiner 172 (step S104). Then, when determining that the page represented by the obtained page number is information paged out to the swap area 121 based on the paging flag of the page management table 150 corresponding to the obtained page number (S105, Yes), the compressor 173 pages in the page from the swap area 121 to the memory 110 (step S106). Then, the compressor 173 compresses the information paged in to the memory 110 (step S107).

On the other hand, when determining that the page represented by the obtained page number is not information paged out to the swap area 121 (step S105, No), the compressor 173 compresses the information stored in the memory area of the page number (step S107). Then, the compressor 173 outputs, to the file outputter 174, the signal representing that the compression processing has been finished.

The file outputter 174 having accepted the signal representing that the compression processing has been finished from the compressor 173 measures the size of the compressed information, outputs the compressed information to the dump file 123 (step S108), and stores the page number, size, and offset of the information outputted to the dump file 123, into the management area of the dump file 123 (step S109).

Then, when all the information stored in the memory 110 has been outputted to the dump file 123 (step S110, Yes), the file outputter 174 ends the processing. Even when not all the information stored in the memory 110 has been outputted to the dump file 123 (step S110, No), when no free space is left in the dump file 123 (step S111, No), the file outputter 174 outputs to the compressor 173 the signal representing that there is no free space left in the dump file 123, and ends the processing.

On the other hand, when not all the information in memory 110 has been outputted to the dump file 123 (step S110, No) and there is free space in the dump file 123 (step S111, Yes) the compressor 173 obtains the page number of the memory area with the second highest priority (step S104). Then, the compressor 173 and the file outputter 174 perform the above-described compression processing and file output processing (steps S105 to S109). The compressor 173 and the file outputter 174 repeat the compression processing and the file output processing in decreasing order of priority of the memory area (steps S104 to S109) until all the information stored in the memory 110 has been outputted to the dump file 123 (step S110, Yes) or there is no free space left in the dump file 123 (step S111, No).

Figure 5:
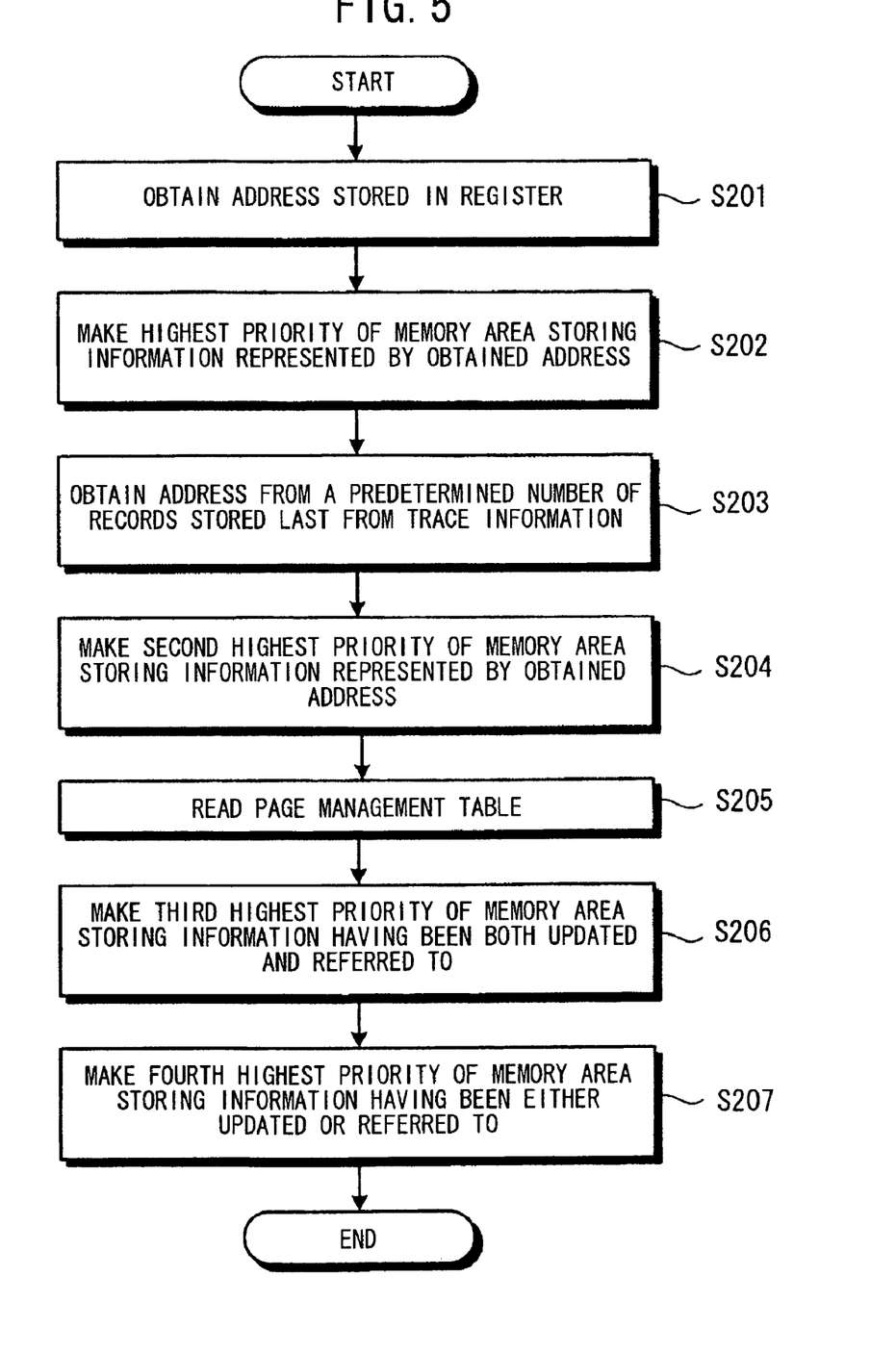
FIG. 5 is a flowchart depicting a priority determination processing procedure by a priority determiner depicted in FIG. 2.

Next, the priority determination processing by the priority determiner 172 depicted in FIG. 2 will be described. FIG. 5 is a flowchart depicting the priority determination processing procedure by the priority determiner 172 depicted in FIG. 2. As depicted in FIG. 5, the priority determiner 172 of the computer 100 obtains the address stored in the register 140 (step S201), and gives the highest priority to the memory area represented by the obtained address (step S202).

Then, the priority determiner 172 obtains the "address stored in the register 140" from the trace information 112 (step S203), and gives the second highest priority to the memory area represented by the obtained address (step S204).

Then, the priority determiner 172 reads the page management table 150 (step S205), gives the third highest priority to the memory area storing information that has been both updated and referred to (step S206), and gives the fourth highest priority to the memory area storing information that has been either updated or referred to (step S207).

As described above, since the computer 100 according to the first embodiment is structured so that the priority of each memory area is determined based on the information stored in the register 140, the trace information 112, and the page management table 150 and the information stored in each memory area is compressed in decreasing order of determined priority and outputted to the dump file 123, the information necessary for failure analysis can be outputted to the dump file 123 while the size of the dump file 123 is small.

While an example in which the compressor 173 compresses the information stored in each memory area without exception is depicted in the above-described first embodiment, the compressor 173 may be structured so as not to compress the information stored in memory areas with high priorities.

Figure 6:
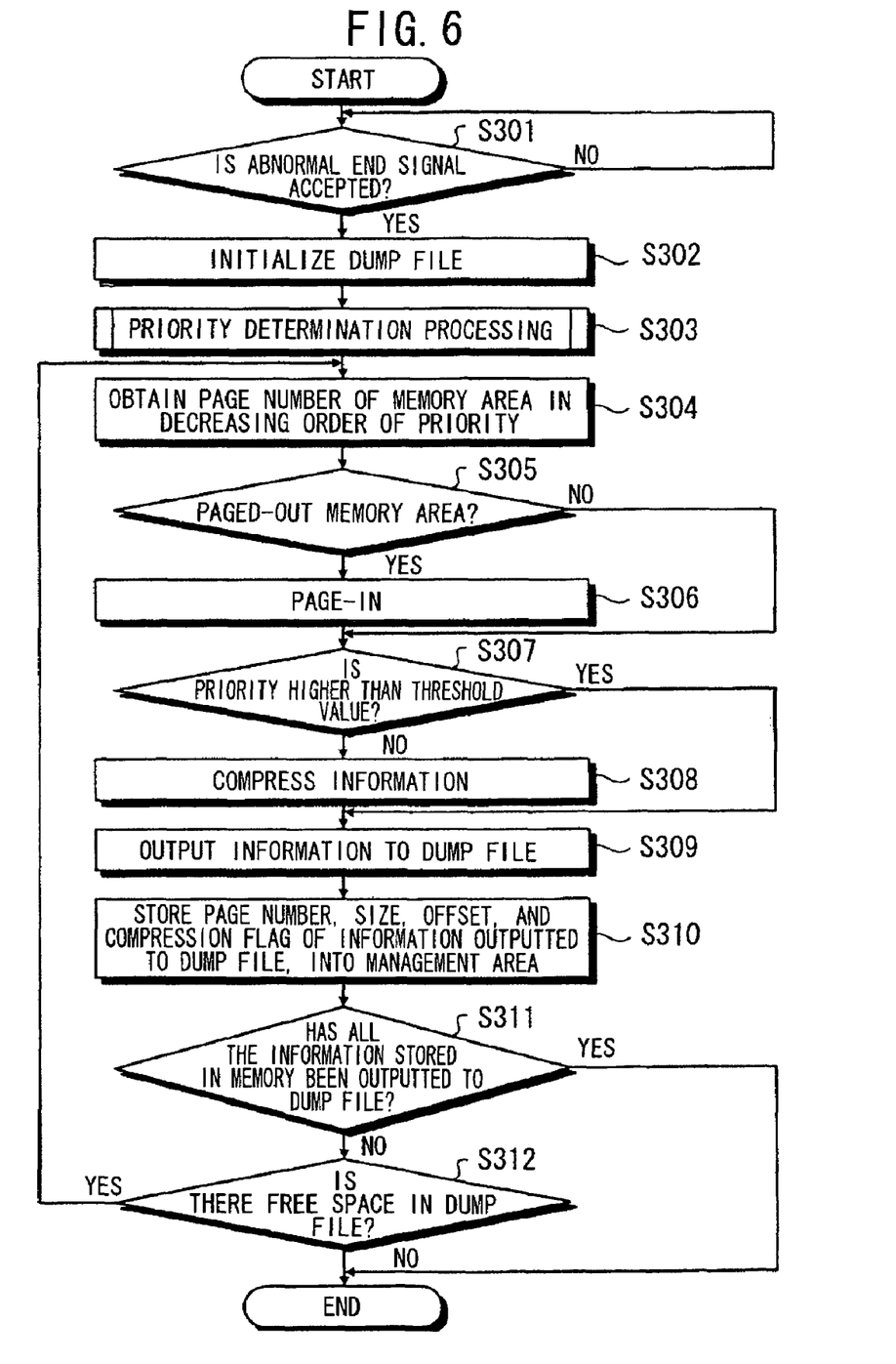
FIG. 6 is a flowchart depicting a dump processing procedure by the computer when the information stored in memory areas with high priorities is not compressed.

The dump processing by the computer 100 in such a case will be described. FIG. 6 is a flowchart depicting the dump processing procedure by the computer 100 when the information stored in memory areas with high priorities is not compressed. Descriptions of similar parts of the processing procedure as those of the processing procedure depicted in FIG. 4 are omitted.

As depicted in the figure, when accepting the signal representing that the program 111 ended abnormally from the computation portion 160 (step S301, Yes), the initializer 171 of the computer 100 obtains the size of the management area of the dump file 123 from the size of the memory 110, and initializes the dump file 123 (step S302). At this time, the initializer 171 initializes the management area so as to include not only the page number, the size, and the offset but also a compression flag representative of whether the information outputted to the dump file 123 is compressed or not. In the description that follows, the compression flag that is "1" indicates that the information outputted to the dump file 123 is compressed and the compression flag that is "0" indicates that the information outputted to the dump file 123 is not compressed.

Then, as described by using FIG. 4, the compressor 173 obtains the page number of the memory area in decreasing order of priority determined by the priority determiner 172 (step S304). When it is determined that the page represented by the obtained page number is information paged out to the swap area 121 (step S305, Yes), the compressor 173 pages in the page (step S306).

Then, when the priority of the memory area that is being currently processed is higher than a predetermined threshold value (step S307, Yes), the compressor 173 outputs the signal representing that the compression processing has been finished, to the file outputter 174 without compressing the information paged in to the memory 110. The file outputter 174 having accepted the signal outputs the non-compressed information to the dump file 123 (step S309).

Then, the file outputter 174 stores the page number, size, offset, and compression flag of the information outputted to the dump file 123, into the management area of the dump file 123 (step S310). In this example, the file outputter 174 stores "0" as the compression flag into the management area of the dump file 123.

On the other hand, when the priority of the memory area that is being currently processed is lower than the predetermined threshold value (step S307, No), the compressor 173 compresses the paged-in information (step S308), and outputs the signal representing that the compression processing has been finished, to the file outputter 174. The file outputter 174 having accepted the signal outputs the compressed information to the dump file 123 (step S309).

Then, the file outputter 174 stores the page number, size, offset, and compression flag of the information outputted to the dump file 123, into the management area of the dump file 123 (step S310). In this example, the file outputter 174 stores "1" as the compression flag into the management area of the dump file 123.

Even in a case where the page represented by the page number in the memory area is not information paged out to the swap area 121 (step S305, No), when the priority of the memory area that is being currently processed is higher than the predetermined threshold value (step S307, Yes), the compressor 173 also outputs the signal representing that the compression processing has been finished, to the file outputter 174 without compressing the information stored in the memory area.

Figure 7:
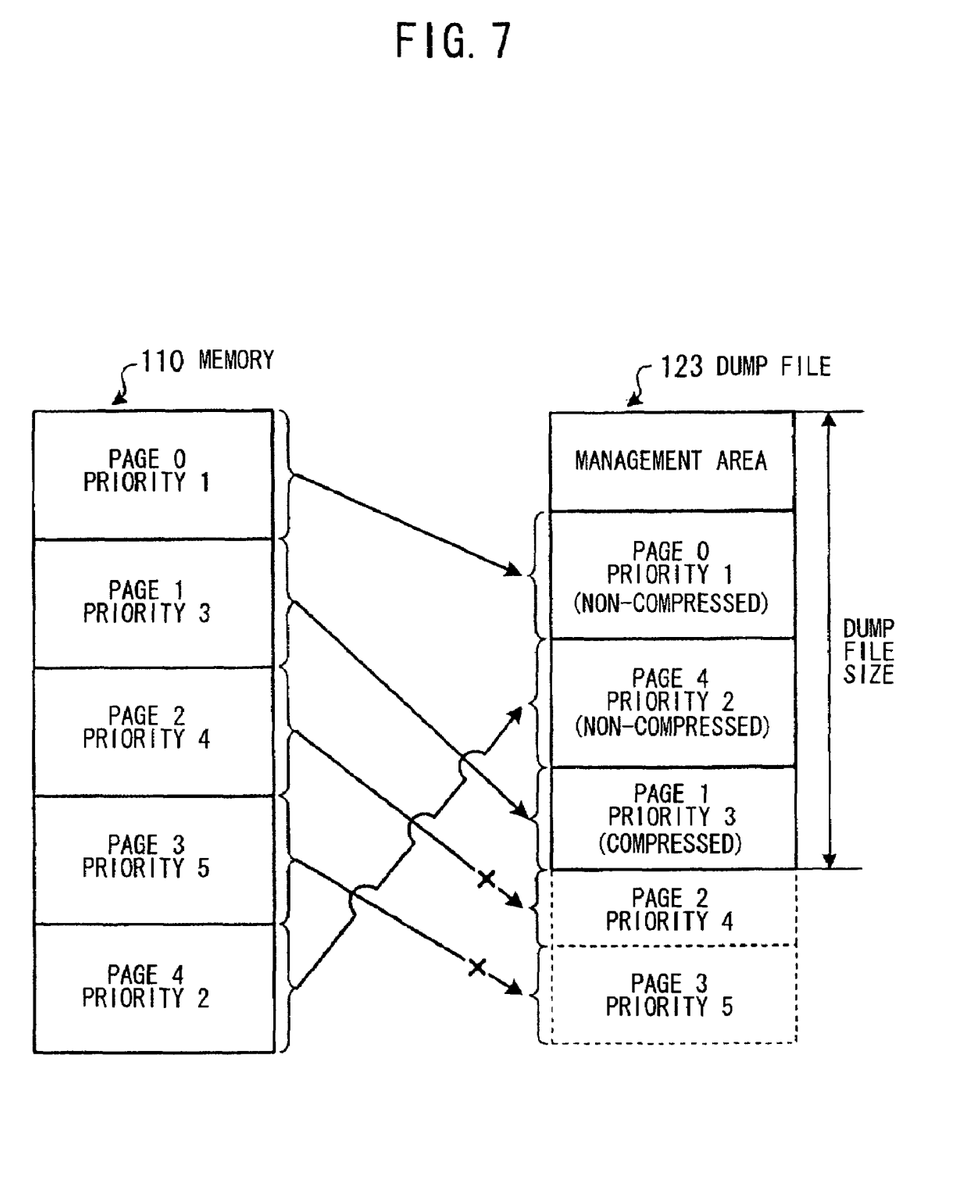
FIG. 7 is a view depicting an example of a dump file when the information stored in the memory areas with high priorities is not compressed.

FIG. 7 depicts an example of the dump file 123 when the information stored in memory areas with high priorities is not compressed. In the example depicted in the figure, the information stored in the memory areas with the priorities of up to "2" is outputted to the dump file 123 without being compressed. Specifically, the information stored in the memory area of the page number "0" with the priority "1" is outputted to the dump file 123 without being compressed. The information stored in the memory area of the page number "4" with the priority "2" is also outputted to the dump file 123 without being compressed. The information stored in the memory area of the page number "1" with the priority "3" is outputted to the dump file 123 in a state of being compressed.

As described above, since the time to decompress the compressed information can be omitted at the time of the analysis of the dump file 123 by structuring the computer so that the information stored in memory areas of high priorities is not compressed, the user can immediately perform failure analysis.

Moreover, by changing the threshold value of the priority to determine whether to compress the information or not, setting can be made so that none of the information outputted to the dump file 123 is compressed. Consequently, the dump processing by the computer 100 can also be applied to systems placing high priority on quick performance of failure analysis. When none of the information outputted to the dump file 123 is compressed, the sizes of the pieces of information outputted to the dump file 123 are the same. Consequently, it is necessary to store only the page numbers in the management area of the dump file 123.

Second Embodiment

While an example in which the priority determiner 172 determines the priority of each memory area based on the information stored in the register 140, the trace information 112, and the page management table 150 is depicted in the above-described embodiment, the priority determiner 172 may determine the priority of each memory area according to the event at the time of the abnormal end. Accordingly, in the second embodiment, an example in which the priority of each memory area is determined according to the event at the time of the abnormal end will be described.

Figure 8:
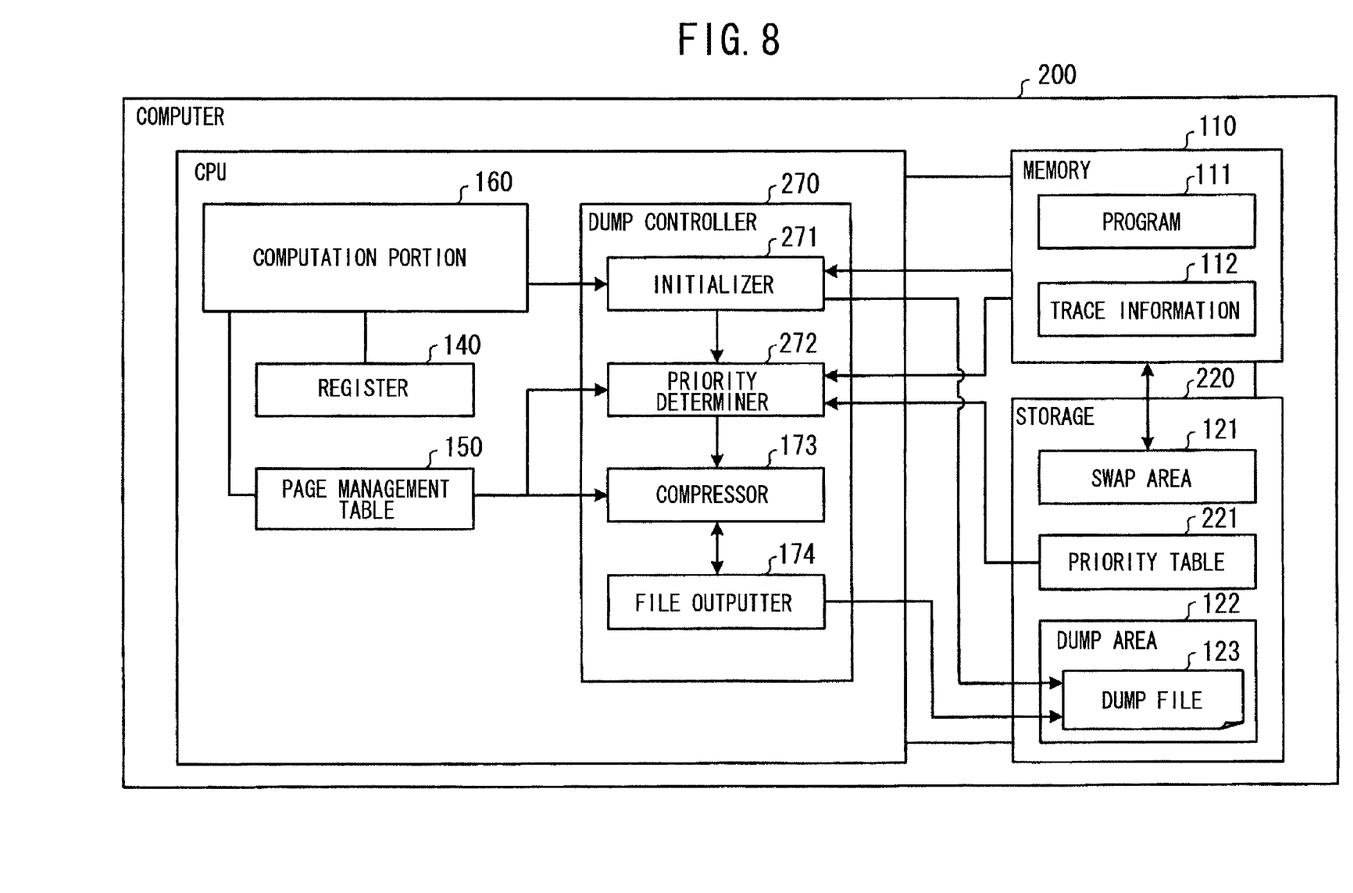
FIG. 8 is a functional block diagram depicting the structure of a computer according to a second embodiment.

FIG. 8 is a functional block diagram depicting the structure of a computer 200 according to a second embodiment. In this embodiment, elements having similar functions to those of the elements depicted in FIG. 2 are denoted by the same reference numerals, and detailed descriptions thereof are omitted.

Figure 9:
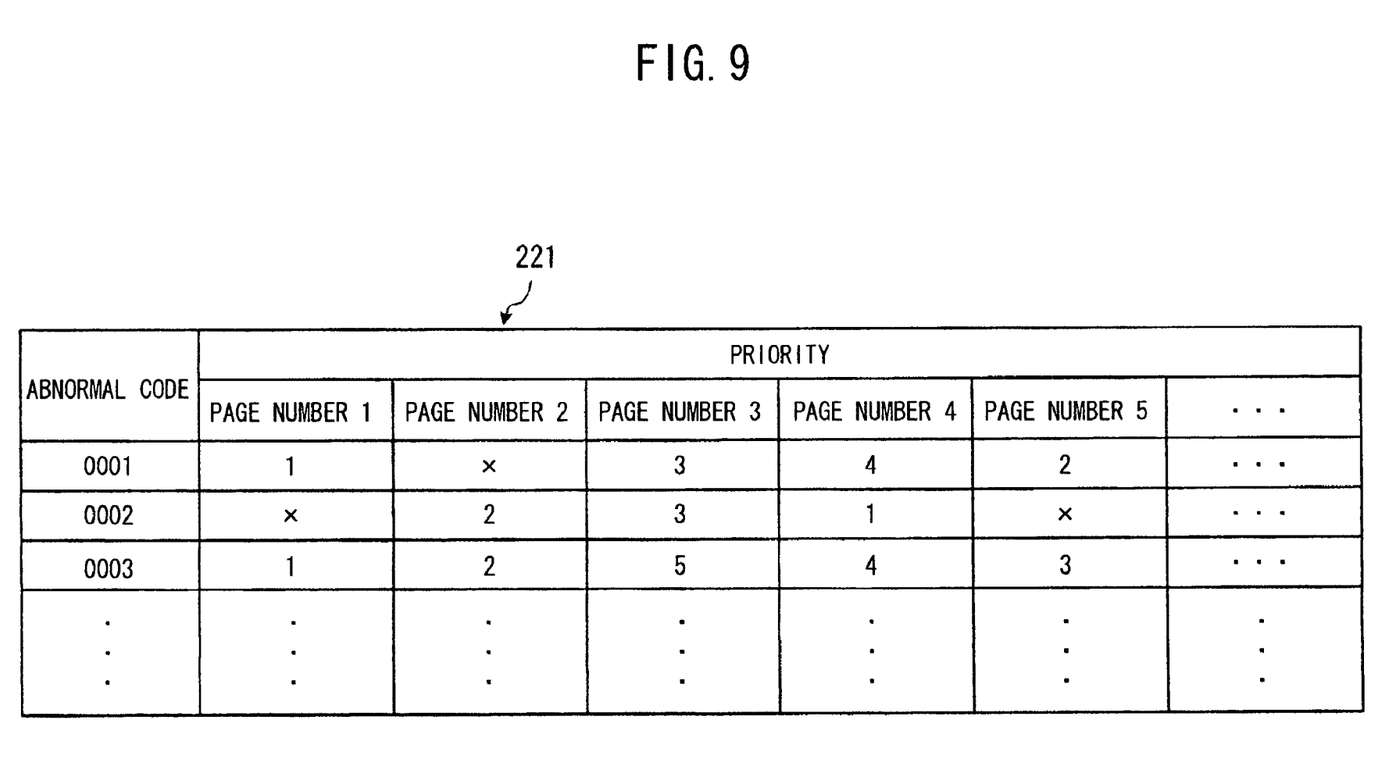
FIG. 9 is a view depicting an example of a priority table.

As depicted in the figure, a storage 220 is newly provided with a priority table 221 compared with the storage 120 depicted in FIG. 2. An example of the priority table 221 is depicted in FIG. 9. As depicted in the figure, the priority table 221 stores the priority of each memory area so as to be associated with an abnormal code.

The abnormal code is a code for identifying the event at the time of the abnormal end of the program 111. This abnormal code is contained in the signal to provide notification from the computation portion 160 to the dump controller 170 when the program 111 ends abnormally. The priority is a number representative of the order in which each page number is dumped into the dump file 123.

The first row of the priority table 221 depicted in FIG. 9 indicates that when the abnormal code is "0001", the priority of the memory area of the page number "1" is "1", the priority of the memory area of the page number "5" is "2", the priority of the memory area of the page number "3" is "3", and the priority of the memory area of the page number "4" is "4". The priority "x" depicted in the figure indicates that it is unnecessary to output the corresponding page number to the dump file 123. Specifically, in the example depicted in the figure, it is indicated that when the abnormal code is "0001", it is unnecessary to output the page number "2" to the dump file 123.

Since the priority table 221 can be updated even after the computer 200 is provided, the priority of each memory area can be flexibly changed after the computer 200 is provided.

A dump controller 270 is different in the processings by an initializer 271 and a priority determiner 272 compared with the initializer 171 and the priority determiner 172 of the dump controller 170 depicted in FIG. 2. The initializer 271 initializes the dump file 123, and outputs the abnormal code accepted from the computation portion 160, to the priority determiner 272.

The priority determiner 272 determines the priority of each memory area based on the information stored in the priority table 221. Specifically, when accepting an abnormal code from the initializer 271, the priority determiner 272 obtains the record coinciding with the abnormal code from the priority table 221. Then, the priority determiner 272 determines the priority of each memory area based on the information stored in the obtained record.

In the example depicted in FIG. 9, when accepting he abnormal code "0003" from the initializer 271, the priority determiner 272 obtains the record corresponding to the abnormal code "0003" from the priority table 221 depicted in the figure. Then, the priority determiner 272 sets the priority of the memory area of the page number "1" at "1", the priority of the memory area of the page number "2" at "2", the priority of the memory area of the page number "5" at "3", the priority of the memory area of the page number "4" at "4", and the priority of the memory area of the page number "3" at "5".

Figure 10:
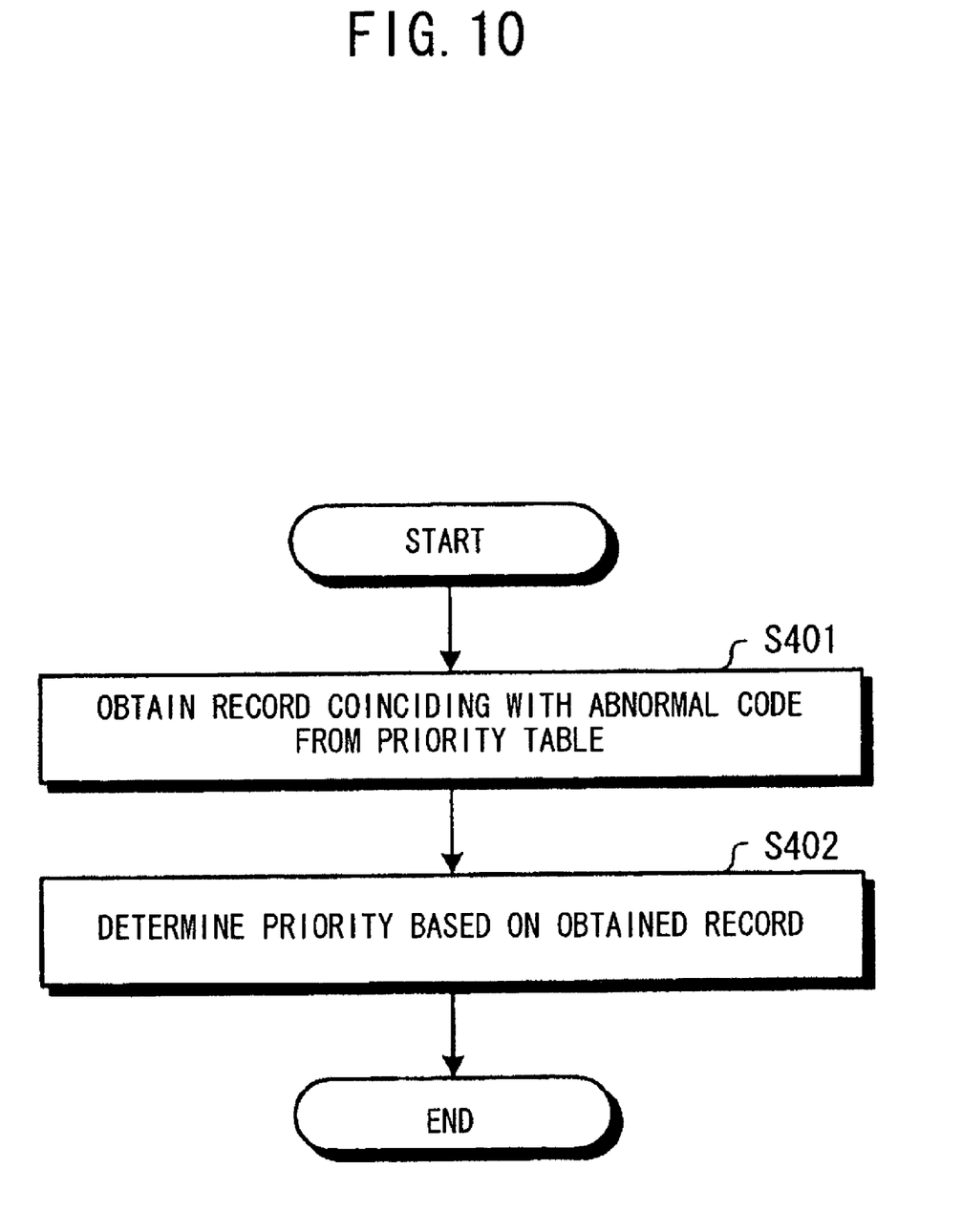
FIG. 10 is a flowchart depicting the priority determination processing procedure by a priority determiner depicted in FIG. 8.

Next, the priority determination processing by the priority determiner 272 depicted in FIG. 8 will be described. FIG. 10 is a flowchart depicting the priority determination processing procedure by the priority determiner 272 depicted in FIG. 8. As depicted in the figure, the priority determiner 272 of the computer 200 obtains, from the priority table 221, the record coinciding with the abnormal code accepted from the initializer 271 (step S401). Then, the priority determiner 272 determines the priority of each memory area based on the information stored in the obtained record (step S402).

As described above, since the computer 200 according to the second embodiment is structured so that the priority of each memory area is determined based on the information stored in the priority table 221, the priority of each memory area can be flexibly changed after the computer 200 is provided.

Third Embodiment

While an example in which the information in the memory 110 is outputted in decreasing order of priority until no free space is left in the dump file 123 in the computer 100 or 200 is depicted in the first and second embodiments, the computer may be structured so that the compression rate is changed so that all the information necessary for performing failure analysis can be outputted to the dump file 123 with reliability. Accordingly, in the third embodiment, an example will be described in which the compression rate is changed so that all the information necessary for performing failure analysis can be outputted to the dump file 123 with reliability.

Figure 11:
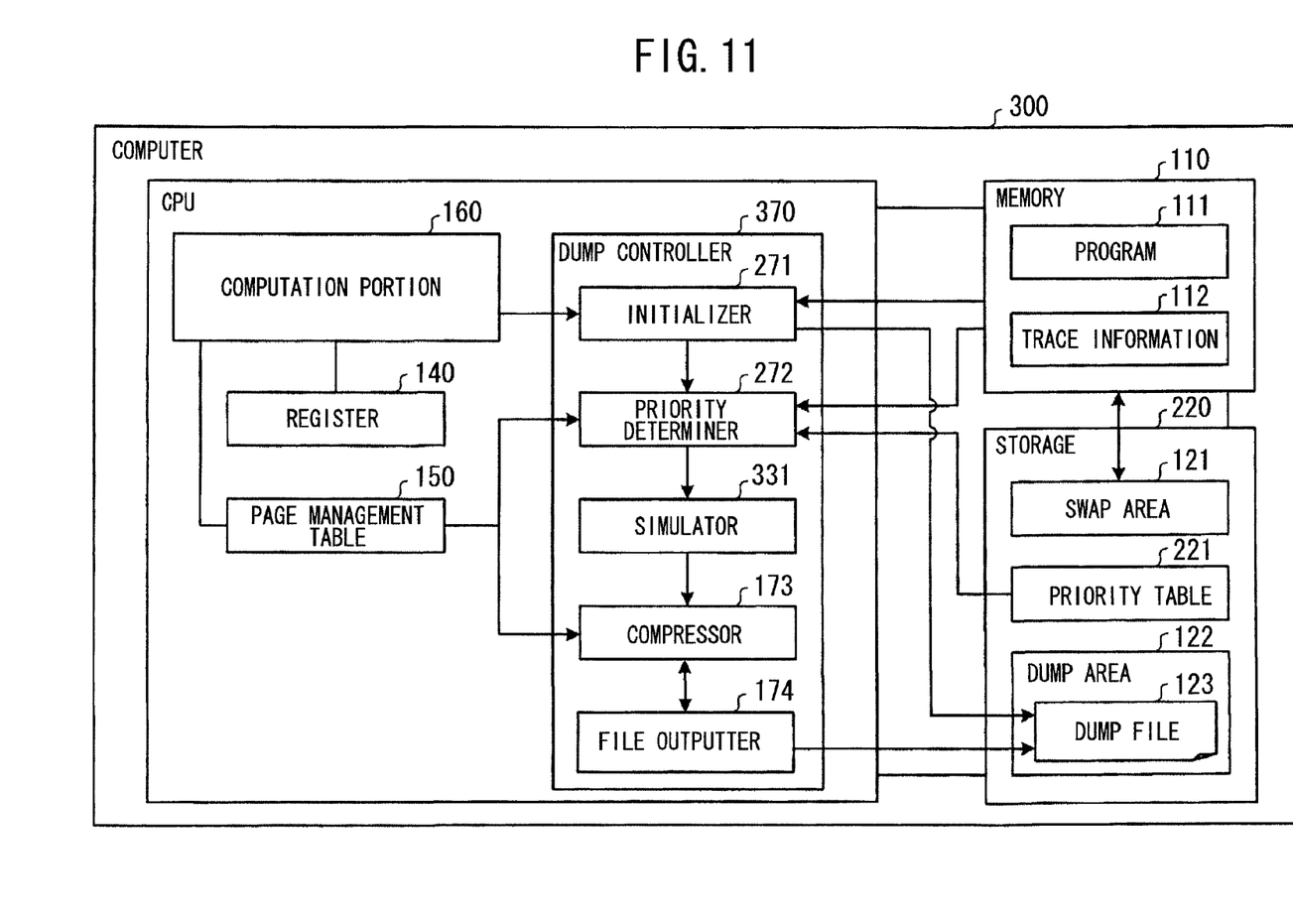
FIG. 11 is a functional block diagram depicting the structure of a computer according to a third embodiment.

FIG. 11 is a functional block diagram depicting the structure of a computer 300 according to a third embodiment. In this embodiment, elements having similar functions to those of the elements depicted in FIG. 8 are denoted by the same reference numerals, and detailed descriptions thereof are omitted.

As depicted in the figure, a dump controller 370 is newly provided with a simulator 331 compared with the dump controller 270 depicted in FIG. 8. The simulator 331 is a processor that simulates whether all the information necessary for the dump file 123 can be outputted or not, based on the priority determined by the priority determiner 272.

Specifically, the simulator 331 compresses the pieces of information stored in the memory areas at a low compression rate in order of priority determined by the priority determiner 272. Then, after compressing all the information in desired memory areas, the simulator 331 compares the total size of all the compressed information with the size of the dump file 123 (the size from which the size of the management area has been subtracted).

When the total size of all the compressed information is smaller than the size of the dump file 123, the simulator 331 outputs, to the compressor 173, information representing that the desired information can all be outputted to the dump file 123 by compressing the information in each memory area at such a compression rate. The compressor 173 having accepted the information compresses the information in each memory area at the accepted compression rate.

On the other hand, when the total size of all the compressed information is larger than the size of the dump file 123, the simulator 331 again compresses the information in each memory area at a little higher compression rate. Then, the simulator 331 compares the total size of all the compressed information with the size of the dump file 123. In this manner, the simulator 331 searches for a minimum compression rate at which the desired information can all be outputted to the dump file 123 while gradually increasing the compression rate.

As described above, since the computer 300 according to the third embodiment is structured so that the simulator 331 searches for a minimum compression rate at which the desired information can all be outputted to the dump file 123, the desired information can all be outputted to the dump file 123. Moreover, since the compression rate at which information is compressed is minimized, the time to decompress the compressed information is reduced when the dump file 123 is analyzed, so that the user can immediately perform failure analysis. This is because, generally, the lower the compression rate is, the shorter the decompression time is.

While the computers 100, 200, and 300 are described in the first, second, and third embodiments, the structures of the computers 100, 200, and 300 depicted in FIGS. 2, 8, and 11 may be changed variously without departing from the scope of the invention. For example, by providing the function of the dump controller 170 of the computer 100 as software and executing it by the computer, a function similar to the computer 100 can be realized. Hereinafter, an example of a computer that executes a dump program 1071 provided with the function of the dump controller 170 as software will be depicted.

Figure 12:
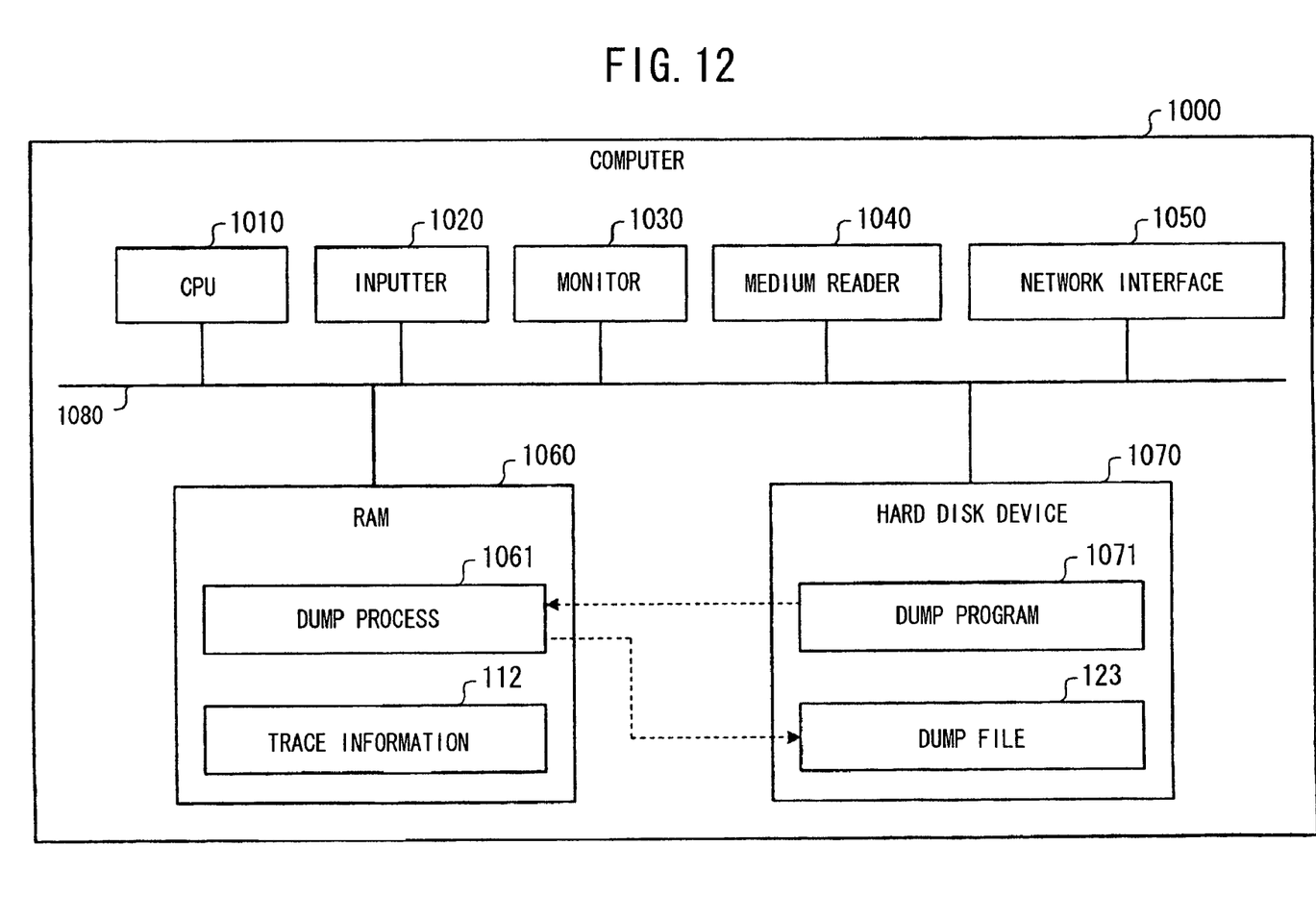
FIG. 12 is a functional block diagram depicting a computer that executes a dump program.

FIG. 12 is a functional block diagram depicting the computer 1000 that executes the dump program 1071. The computer 1000 includes: a CPU 1010 that executes various computation processings; an inputter 1020 that accepts data input from the user; a monitor 1030 that displays various pieces of information; a medium reader 1040 that reads programs and the like from a recording medium; a network interface 1050 that performs data transmission and reception with another computer through a network; a RAM 1060 that temporarily stores various pieces of information; and a hard disk device 1070. These elements are connected by a bus 1080.

The hard disk device 1070 stores the dump program 1071 having a similar function to that of the dump controller 170 depicted in FIG. 2, and the dump file 123. While FIG. 12 depicts an example of the dump program 1071 provided with the function of the dump controller 170 of the computer 100 as software, in the case of a dump program provided with the function of the dump controller 270 of the computer 200 as software, the hard disk device 1070 stores data corresponding to the priority table depicted in FIG. 8.

The CPU 1010 reads the dump program 1071 from the hard disk device 1070 and develops it in the RAM 1060, whereby the dump program 1071 functions as a dump process 1061. When programs executed by the CPU 1010 end abnormally, the dump process 1061 stores the contents of the memory into the hard disk device 1070 as the dump file 123.

It is not always necessary that the dump program 1071 be stored in the hard disk device 1070. A structure may be adopted in which the computer 1000 reads and executes the dump program stored in a storage medium such as a CD-ROM. Moreover, a structure may be adopted in which the dump program is stored in another computer (or server) or the like connected to the computer 1000 through the public network, the Internet, a LAN (local area network), a WAN (wide area network) or the like and the computer 1000 reads the program therefrom and executes it.

What is claimed is:

1. A computer that dumps information stored in a storage space used by a program, into a file when the program ends abnormally, the computer comprising:
   a priority determiner that determines a priority representative of an order in which the information is dumped into the file, for each of a plurality of storage areas which are predetermined areas into which the storage space is divided;
   a compressor that compresses the information stored in each storage area in decreasing order of priority determined by the priority determiner;
   file outputter that outputs the compressed information to the file in an order in which the information is compressed by the compressor; and
   a storage that stores a priority table storing the priority of each storage area so as to be associated with an abnormal code,
   wherein the priority determiner determines the priority of the storage area according to the priority stored in the priority table.

2. The computer according to claim 1, wherein the compressor does not compress the information stored in the storage area whose priority determined by the priority determiner is higher than a predetermined threshold value, and compresses the information stored in the storage area whose priority determined by the priority determiner is lower than the predetermined threshold value.

3. A non-transitory computer-readable storage medium storing a dump program to dump information stored in a storage space used by a program, into a file when the program ends abnormally, the storage medium storing the dump program causing a computer to execute:
   determining a priority representative of an order in which the information is dumped into the file, for each of a plurality of storage areas which are predetermined areas into which the storage space is divided;
   compressing the information stored in each storage area in decreasing order of priority determined by the priority determining; and
   outputting the compressed information to the file in an order in which the information is compressed by the compressing,
   wherein in the priority determining, the priority of the storage area is determined according to the priority stored in a priority table of a storage storing the priority so as to be associated with an abnormal code.

4. The non-transitory computer-readable storage medium storing the dump program according to claim 3, wherein in the compressing, the information stored in the storage area whose priority determined by the priority determining is higher than a predetermined threshold value is not compressed, and the information stored in the storage area whose priority determined by the priority determining is lower than the predetermined threshold value is compressed.

5. A dump method of dumping information stored in a storage space used by a program, into a file when the program ends abnormally, the dump method comprising:
   determining a priority representative of an order in which the information is dumped into the file, for each of a plurality of storage areas which are predetermined areas into which the storage space is divided;
   compressing the information stored in each storage area in decreasing order of priority determined by the priority determining; and
   outputting the compressed information to the file in an order in which the information is compressed by the compressing,
   wherein in the priority determining, the priority of the storage area is determined according to the priority stored in a priority table of a storage storing the priority so as to be associated with an abnormal code.

6. The dump method according to claim 5, wherein in the compressing, the information stored in the storage area whose priority determined by the priority determining is higher than a predetermined threshold value is not compressed, and the information stored in the storage area whose priority determined by the priority determining is lower than the predetermined threshold value is compressed.

* * * * *